United States Patent
Becker et al.

(10) Patent No.: US 7,917,109 B2
(45) Date of Patent: *Mar. 29, 2011

(54) MOTOR VEHICLE DATA COMMUNICATION NETWORK

(75) Inventors: Michael Becker, Philippsburg (DE); Dirk Lappe, Karlsruhe (DE)

(73) Assignee: Herman Becker Automotive System GmbH, Karlsbad (DE)

( * ) Notice: Subject to any disclaimer, the term of this patent is extended or adjusted under 35 U.S.C. 154(b) by 859 days.

This patent is subject to a terminal disclaimer.

(21) Appl. No.: 10/005,208

(22) Filed: Dec. 4, 2001

(65) Prior Publication Data

US 2002/0098854 A1 Jul. 25, 2002

(30) Foreign Application Priority Data

Dec. 4, 2000 (DE) .................................. 100 60 168

(51) Int. Cl.
*H04B 1/18* (2006.01)
(52) U.S. Cl. .................. 455/151.4; 455/159; 370/419; 370/508; 370/345; 370/401; 701/36
(58) Field of Classification Search .................. 455/465, 455/426, 66, 149, 151.4, 426.1, 422.1, 66.1, 455/151.2, 151.1, 569.2, 575.9, 345, 41.2, 455/41.3, 150.1, 150.2, 130; 701/1, 36, 37; 370/458, 449, 419, 508, 345, 401
See application file for complete search history.

(56) References Cited

U.S. PATENT DOCUMENTS

| | | | |
|---|---|---|---|
| 5,552,921 A | 9/1996 | Hetzel et al. .................. 359/173 |
| 5,633,629 A | 5/1997 | Hochstein .................... 340/907 |
| 5,689,252 A | 11/1997 | Ayanoglu et al. ............. 340/991 |
| 5,732,074 A * | 3/1998 | Spaur et al. .................... 370/313 |
| 5,923,662 A | 7/1999 | Stirling et al. ................ 370/432 |
| 5,940,398 A | 8/1999 | Stiegler et al. ................ 370/424 |
| 5,983,087 A | 11/1999 | Milne et al. ................... 455/149 |
| 5,995,512 A | 11/1999 | Pogue, Jr. ..................... 370/419 |
| 6,069,588 A * | 5/2000 | O'Neill, Jr. .................... 343/713 |
| 6,078,622 A | 6/2000 | Boytim et al. ................ 375/257 |
| 6,148,253 A | 11/2000 | Taguchi et al. ................ 701/48 |
| 6,157,725 A * | 12/2000 | Becker ............................ 381/86 |
| 6,233,506 B1 | 5/2001 | Obradovich et al. ............ 701/1 |
| 6,256,578 B1 | 7/2001 | Ito .................................. 701/200 |
| 6,414,941 B1 * | 7/2002 | Murakami ..................... 370/245 |
| 6,542,758 B1 * | 4/2003 | Chennakeshu et al. ..... 455/569.2 |

(Continued)

FOREIGN PATENT DOCUMENTS

DE 19925018 A1 12/1999

(Continued)

OTHER PUBLICATIONS

Hartwig et al., "Mobile Multimedia—Challenges and Opportunities," IEEE Transactions on Consumer Electronics, vol. 46, No. 4, Nov. 2000, pp. 1167-1178.

(Continued)

*Primary Examiner* — Ajit Patel
*Assistant Examiner* — Khai M Nguyen
(74) *Attorney, Agent, or Firm* — O'Shea Getz P.C.

(57) ABSTRACT

To make possible communication between a MOST network and an external receiver and an external transmitter, the MOST network is connected to an interface, which transforms data in the MOST standard into a standard suitable for the external receiver, and transforms data received from the external transmitter into the MOST standard.

6 Claims, 1 Drawing Sheet

U.S. PATENT DOCUMENTS

| | | | |
|---|---|---|---|
| 6,633,809 B1* | 10/2003 | Aizono et al. | 701/200 |
| 6,647,327 B1* | 11/2003 | Wolf et al. | 701/36 |
| 6,683,886 B1* | 1/2004 | Eftimakis et al. | 370/458 |
| 6,694,143 B1* | 2/2004 | Beamish et al. | 455/456.1 |
| 6,708,217 B1* | 3/2004 | Colson et al. | 709/231 |
| 6,798,084 B1* | 9/2004 | Gobel et al. | 307/10.1 |
| 6,862,357 B1* | 3/2005 | Albus et al. | 381/86 |
| 2002/0054520 A1* | 5/2002 | Bahren et al. | 365/200 |
| 2002/0094829 A1* | 7/2002 | Ritter | 455/517 |
| 2003/0021262 A1* | 1/2003 | Ma et al. | 370/352 |
| 2005/0090953 A1* | 4/2005 | Wolf et al. | 701/36 |
| 2008/0167069 A1* | 7/2008 | Bridgelall | 455/553.1 |

FOREIGN PATENT DOCUMENTS

| | | | |
|---|---|---|---|
| DE | 19954758 A1 | 5/2001 | |
| EP | 0748727 | 12/1996 | 25/10 |
| EP | 0899161 | 12/2003 | 11/2 |

OTHER PUBLICATIONS

Tappe et al., "MOST—Media Oriented System Transport," Elektronik—Fachzeitschrift Für Industrielle Anwender Und Entwickler, vol. 14, No. 14, Jul. 2000, pp. 2-7, XP002212688.

* cited by examiner

MOTOR VEHICLE DATA COMMUNICATION NETWORK

BACKGROUND OF THE INVENTION

The present invention relates to the transmission of data between data networks over a wireless link, and in particular to the transmission of data between a MOST network and a wireless device.

A MOST (media oriented systems transport or media oriented synchronous transfer) network is commonly implemented in multimedia systems installed for example in modern state-of-the-art vehicles. One conventional approach to a local network in a vehicle is disclosed in German Patent Specification DE 195 03 213 C1. Such motor vehicles can include, for example, passenger cars, trucks, buses and other types of vehicles. A MOST network has, for example, a ring structure that communicably links several units that serve as data sources or data sinks. Such network devices include units such as for example, a radio receiver, a television receiver, a monitor, a CD player, a CD changer, a DVD player, a DVD changer, a cassette recorder, active loudspeakers, a navigation system, a car telephone, a wireless telephone, and operating and control units, among others.

There is a need for a MOST network that is capable of transmitting data to an external receiver and receiving data from an external transmitter over a wireless communication channel.

SUMMARY OF THE INVENTION

Briefly, according to an aspect of the present invention, a MOST network includes a plurality of units that are arranged on a ring bus. A wireless transceiver interface is connected to the ring bus, and receives input data from and transmits output data to a wireless device over a wireless communication channel.

The wireless transceiver can be configured and arranged to provide output data in a format compatible with Bluetooth.

In one embodiment the wireless device may be associated with a second MOST network, to provide a wireless communication channel between the MOST networks.

The interface connected to the MOST network transforms data received from a unit of the MOST network into a standard suitable for transmission over the wireless communication channel, and transforms the data received from the wireless device into a format compatible with the MOST standard.

Advantageously, the interface connected to the MOST network transmits data from the MOST network to the external receiver, and receives data from the external transmitter. For example, the interface can transform data in the MOST standard into the Bluetooth, DECT, or other standards, and vice versa. The data transmission between the MOST network and the external receiver or external transmitter is preferably wireless. For example, the external receiver and the external transmitter can be combined in a terminal device (e.g., a personal computer, a cordless telephone, etc.).

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
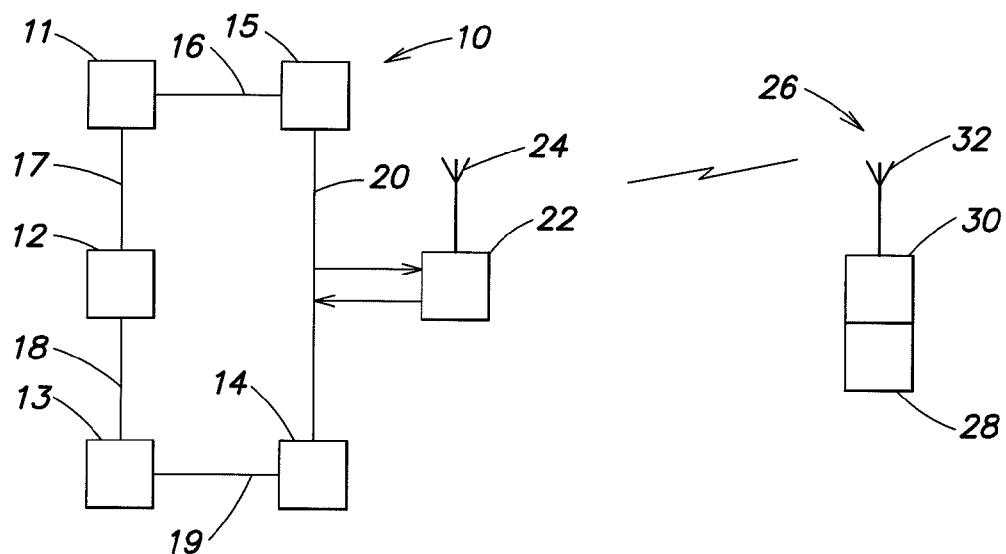
FIG. 1 is a block diagram illustration of a first embodiment of the invention.

FIG. 1 illustrates a MOST network 10 having a plurality of units 11-15, which are linked by connecting sections 16-20. An interface 22 with an antennae 24 is connected to the MOST network 10. A wireless device 26 includes an external receiver 28 and an external transmitter 30 connected to an antennae 32. Through the two antennas 24 and 32, the MOST network 10 communicates with the wireless device 26 over a wireless communication channel (i.e., a radio connection). The external receiver 28 and the external transmitter 30 can be combined, for example, in a personal computer or a cordless telephone.

Figure 2:
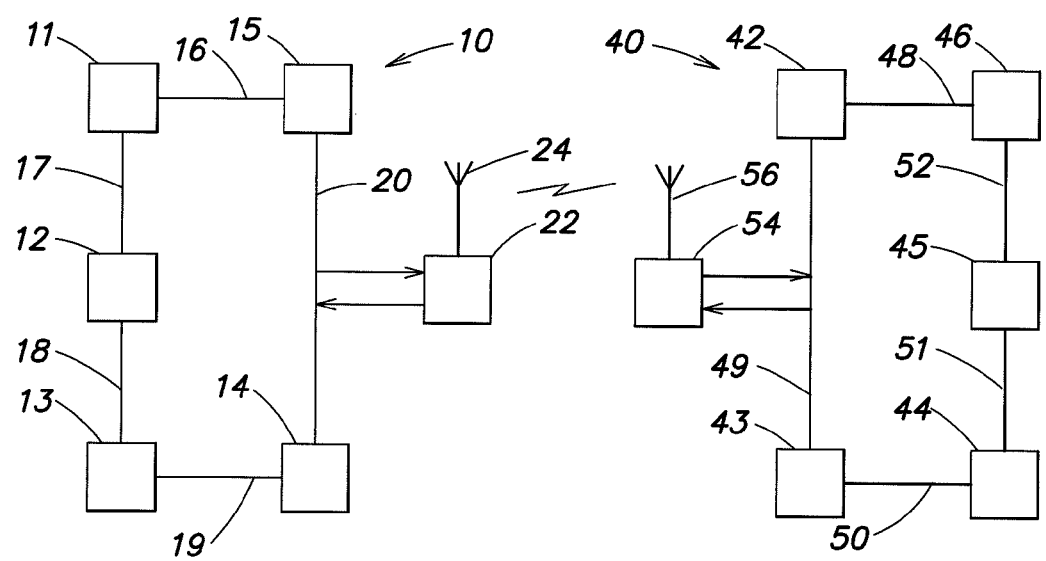
FIG. 2 is a block diagram illustration of a second embodiment of the invention.

FIG. 2 is a block diagram illustration of a second embodiment of the invention, in which the external receiver and the external transmitter are associated with a second MOST network 40. The second MOST network 40 includes a plurality of units 42-46 linked to one another through connecting sections 48-52. An interface 54 with an antenna 56 is connected to the second MOST network 40. Data can be transmitted in both directions between units of the first MOST network 10 and the second MOST network 40 through the two interfaces 22 and 54. As a result, vehicles equipped with the inventive MOST network can communicate with one another. Data are transmitted between the two MOST networks, preferably in wireless mode, for example in the Bluetooth standard.

Although the present invention has been shown and described with respect to several preferred embodiments thereof, various changes, omissions and additions to the form and detail thereof, may be made therein, without departing from the spirit and scope of the invention.

What is claimed is:

1. A motor vehicle Media Oriented Systems Transport data communication network, comprising:
    a ring bus;
    a plurality of multimedia units connected to the ring bus; and
    a wireless transceiver connected to the ring bus, where the wireless transceiver receives outgoing data from the ring bus and transforms the outgoing data to a wireless data format and transmits the transformed data, and receives incoming data and transforms the incoming data and provides transformed incoming data indicative thereof to the ring bus, where the incoming data is formatted as Bluetooth data.

2. The Media Oriented Systems Transport data communication network of claim 1, where the plurality of multimedia units includes a DVD player.

3. The Media Oriented Systems Transport data communication network of claim 1, where the plurality of multimedia units includes an audio player.

4. The Media Oriented Systems Transport data communication network of claim 1, where the plurality of multimedia units includes a navigation system.

5. A method of communicating over a wireless communication channel between a motor vehicle Media Oriented Systems Transport network having a wireless transceiver and a wireless device, comprising:
    receiving outgoing data at the wireless transceiver in a first data format compatible with the Media Oriented Systems Transport network and transforming the outgoing data to a second data format compatible with the wireless communication channel and providing a transformed output signal indicative thereof;

transmitting the transformed output signal over the wireless communication channel; and receiving incoming data at the wireless transceiver in the second data format and transforming the incoming data to the first data format, and providing a transformed input signal indicative thereof, where the second data format is compatible with Bluetooth.

6. A motor vehicle Media Oriented Systems Transport data communication network that communicates over a wireless communication channel with a wireless device, comprising:

a ring bus;

a plurality of multimedia units connected to the ring bus; and means for receiving outgoing data from the ring bus in a first data format compatible with the Media Oriented Systems Transport network, and for transforming the outgoing data to a second data format compatible with a wireless communication channel and for transmitting a transformed output data signal indicative thereof over the wireless communication channel, where the transformed output data signal is formatted as Bluetooth data.

* * * * *